United States Patent
Sohn et al.

(10) Patent No.: US 7,894,833 B2
(45) Date of Patent: Feb. 22, 2011

(54) METHOD AND SYSTEM FOR TRANSMITTING MULTIMEDIA MESSAGE TRANSMITTED FROM TRANSMITTING MOBILE STATION OF HIGHER VERSION TO RECEIVING MOBILE STATION OF LOWER VERSION

(75) Inventors: Sang-Mok Sohn, Seongnam-si (KR); Hong-Seo Yun, Jung-gu (KR); Dong-won Na, Seongnam-si (KR); Ja-Young Yoon, Seoul (KR); Hee-Won Park, Seoul (KR); Bum-Joon Kwon, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 537 days.

(21) Appl. No.: 10/569,401

(22) PCT Filed: Jul. 1, 2004

(86) PCT No.: PCT/KR2004/001617
§ 371 (c)(1), (2), (4) Date: Dec. 12, 2006

(87) PCT Pub. No.: WO2005/020605
PCT Pub. Date: Mar. 3, 2005

(65) Prior Publication Data
US 2007/0171938 A1    Jul. 26, 2007

(30) Foreign Application Priority Data

| Aug. 22, 2003 | (KR) | 10-2003-0058294 |
| Oct. 24, 2003 | (KR) | 10-2003-0074564 |
| Nov. 14, 2003 | (KR) | 10-2003-0080489 |

(51) Int. Cl.
*H04W 40/00* (2009.01)
*H04B 1/38* (2006.01)
*G06F 15/16* (2006.01)

(52) U.S. Cl. .......... 455/466; 455/445; 455/566; 455/428; 709/206

(58) Field of Classification Search .......... 370/310; 455/466, 566, 445; 709/203–207
See application file for complete search history.

(56) References Cited

U.S. PATENT DOCUMENTS 5,548,789 A * 8/1996 Nakanura .......... 709/206

(Continued)

FOREIGN PATENT DOCUMENTS

KR    2002-0044306    6/2002

(Continued)

OTHER PUBLICATIONS

International Search Report and Written Opinion corresponding to PCT/KR2004/001617, under date of mailing of Oct. 15, 2004.
Korean Office Action for Korean application No. 10-2003-058294, citing the attached reference(s).

*Primary Examiner*—Huy Phan
*Assistant Examiner*—Munsoon Choo
(74) *Attorney, Agent, or Firm*—Lowe Hauptman Ham & Berner LLP

(57) ABSTRACT

The present invention relates to a method and system for transmitting a multimedia message, which reconstructs a multimedia message to be appropriate for the receiving mobile station and transmits the reconstructed message, when the multimedia message is requested to be transmitted from a transmitting station of a higher version to the receiving station of a lower version and the multimedia message may not be transcoded into a form which can be processed by the receiving mobile station. The present invention enables to transmit various types of multimedia message without being limited by the specification of the receiving mobile station.

7 Claims, 2 Drawing Sheets

U.S. PATENT DOCUMENTS

| | | | |
|---|---|---|---|
| 6,556,217 B1* | 4/2003 | Makipaa et al. | 345/667 |
| 6,961,754 B2* | 11/2005 | Christopoulos et al. | 709/204 |
| 7,181,538 B2* | 2/2007 | Tam et al. | 709/246 |
| 7,212,570 B2* | 5/2007 | Akiyama et al. | 375/240.01 |
| 7,685,315 B2* | 3/2010 | Pessi et al. | 709/246 |
| 2002/0102938 A1* | 8/2002 | Tsubaki et al. | 455/3.06 |
| 2003/0014528 A1* | 1/2003 | Crutcher et al. | 709/229 |
| 2003/0204613 A1* | 10/2003 | Hudson et al. | 709/231 |
| 2003/0217007 A1* | 11/2003 | Fukushima et al. | 705/51 |
| 2004/0063449 A1* | 4/2004 | Fostick | 455/517 |
| 2004/0098463 A1* | 5/2004 | Shen et al. | 709/213 |
| 2004/0198308 A1* | 10/2004 | Hurst et al. | 455/403 |
| 2005/0138123 A1* | 6/2005 | Yun et al. | 709/206 |
| 2005/0143136 A1* | 6/2005 | Lev et al. | 455/566 |

FOREIGN PATENT DOCUMENTS

| | | |
|---|---|---|
| KR | 1020030048502 | 6/2003 |
| WO | WO 99/61966 | 12/1999 |

[Fig. 1]
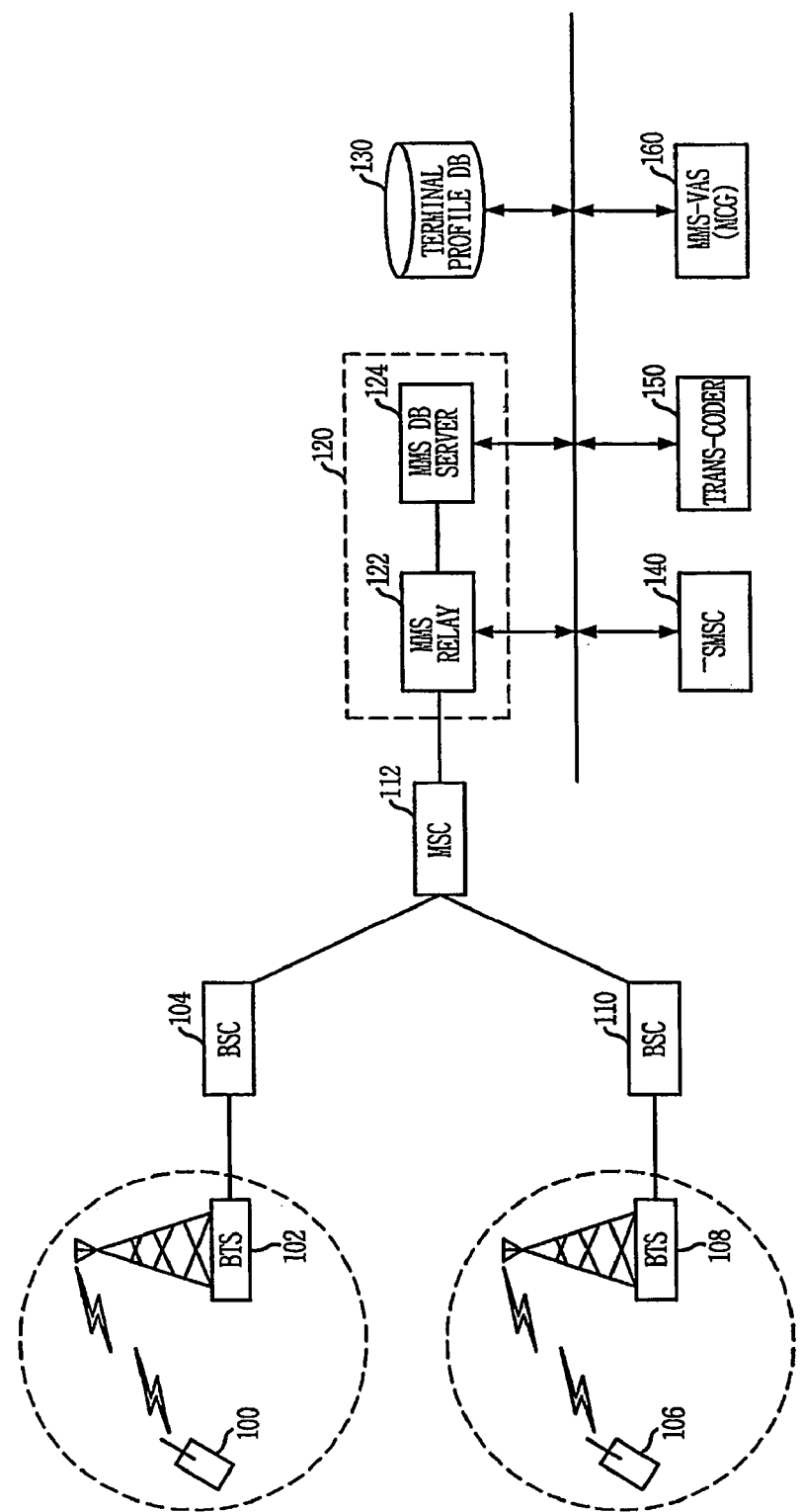

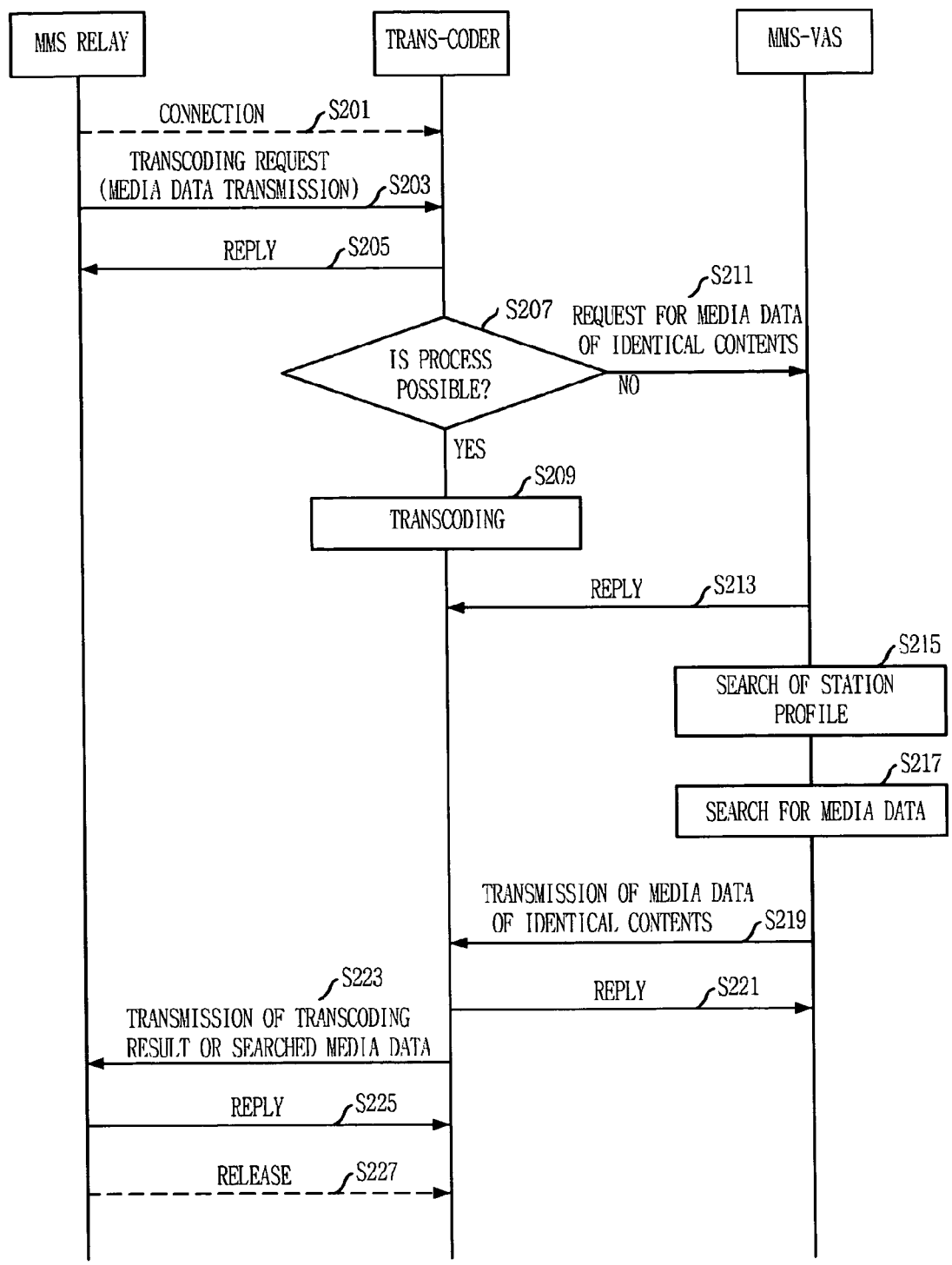
[Fig. 2]

METHOD AND SYSTEM FOR TRANSMITTING MULTIMEDIA MESSAGE TRANSMITTED FROM TRANSMITTING MOBILE STATION OF HIGHER VERSION TO RECEIVING MOBILE STATION OF LOWER VERSION

BACKGROUND OF THE INVENTION

1. Field of the Invention

The present invention relates generally to a method and system for transmitting a multimedia message transmitted from the transmitting mobile station of a higher version to a receiving mobile station of a lower version and, more particularly, to a method and system for reconstructing a multimedia message in a form appropriate for the specification of a receiving mobile station and transmitting the reconstructed multimedia message to the receiving mobile station.

2. Description of the Related Art

Recently, Multimedia Messaging Service (MMS) transmitting multimedia messages through mobile stations has been widely used. In the early stages of the service, multimedia messages including still images were serviced. However, in these days, multimedia messages including various types of data such as moving images are being serviced.

MMS is a service defined by international standards, such as 3rd Generation Partnership Project (3GPP) Technical Specification (TS) 22.140 and 23.140. The MMS is capable of transmitting and receiving short messages and various multimedia data (e.g. voice, image, audio and video data) between stations.

The MMS, defined by the international standards, adopts a store-and-forward method as a message transmission method. A multimedia message is transmitted with encapsulated media contents, information required to describe the media contents, and address information required to identify a message recipient. The multimedia message is transmitted from a transmitting mobile station to a Multimedia Messaging Service Center (MMSC). Furthermore, the MMSC informs a receiving mobile station of the storing of the multimedia message. The multimedia message stored in the MMSC is transmitted to the receiving mobile station in response to a request from the receiving mobile station.

The MMS is classified into a service capable of transmitting only still images, a service capable of transmitting moving images, and a Synchronized Multimedia Integration Language (SMIL) MMS capable of providing various display functions for each type of multimedia data, according to the types of the serviced multimedia data. With the development of the services, some stations became unable to reproduce the transmitted multimedia messages.

That is, in the case of constructing an MMS message using a station capable of supporting the SMIL MMS, and transmitting the MMS message to a conventional Wireless Application Protocol (WAP) receiving mobile station having a lower bandwidth and a lower specification, the receiving mobile station cannot reproduce the large volume photo images included in the SMIL MMS message due to a limitation in the WAP buffer size of the receiving mobile station.

To solve the problem, transcoding technology was proposed. Transcoding refers to the technology of searching the profile of a receiving mobile station, converting a requested MMS message to be optimum for the receiving mobile station, and transmitting the optimum MMS message to the receiving mobile station.

However, satisfactory data conversion results could not be achieved even though format conversion, resolution conversion and chord conversion were performed on the media data (e.g., images, animations and audio) included in a multimedia message using the transcoding technology. The reason is as follows. In the case of JPEG images, format and resolution conversion is possible. However, in the case of Simple Image Solution (SIS) images, format conversion is possible (only between high quality SIS and low one) but resolution conversion is impossible. Additionally, in the case of MA-x (MA-1, MA-2, MA-3, MA-4, or MA-5) audio, format and chord conversion is impossible. Accordingly, even in the MMS system that uses the transcoding technology, the receiving mobile station has a limitation in the reproduction of the multimedia message if a SIS image or MA-x audio is included in the multimedia message transmitted to the receiving mobile station.

SUMMARY OF THE INVENTION

Accordingly, the present invention was contemplated to solve the above problems of the prior art. An object of the present invention is to provide a method and system for transmitting a multimedia message, which reconstructs a multimedia message to be appropriate for the receiving mobile station and transmits the reconstructed message, when the multimedia message is transmitted from a transmitting station of a higher version to the receiving station of a lower version and the multimedia message is not transcoded into a format appropriate for the receiving mobile station. The present invention thus enables to transmit any type of multimedia message regardless of the specification of the receiving mobile station.

In order to accomplish the above object, the present invention provides a MMS system, the MMS system storing a multimedia message transmitted from a specific transmitting mobile station and transmitting the multimedia message to a specific receiving mobile station in response to a download request from the receiving mobile station, including an MMS relay server; a first Database (DB) storing the multimedia message whose transmission is requested; a second DB storing the specification information of stations; a transcoder ascertaining the specification of the receiving mobile station with reference to the second DB in response to a request from the MMS relay server, and reconstructing the multimedia message, whose transmission is requested, to be appropriate for the ascertained receiving mobile station; and a content storage server storing media of identical contents each having various formats, resolutions, or chords, wherein transcoder receives another image and/or audio of contents, which is identical with those of the image and/or audio included in the multimedia message, whose transmission is requested, and has a format, a resolution or a chord appropriate for the specification of the receiving mobile station, with respect to the image and/or audio whose transcoding is impossible, converts the multimedia message whose transmission is requested, and transmits the converted multimedia message to the MMS relay server.

The content storage server may ascertain the specification of the receiving mobile station with reference to the second DB in response to a request from the transcoder, search for an image and/or audio optimum for the specification of the receiving mobile station, provide the optimum image and/or audio to the transcoder, and search for another image and/or audio capable of being reproduced on the receiving mobile station and provides the searched image and/or audio to the transcoder if the image and/or audio optimum for the specification of the receiving mobile station has not been found.

When the transcoder is informed that the image appropriate for the receiving mobile station has not been found by the content storage server, the transcoder may include an original image in the multimedia message if a display size of the receiving mobile station can accommodate a size of the original image included in the multimedia message whose transmission is requested, and the transcoder may give notice of an error if the display size of the receiving mobile station cannot accommodate the size of the original image.

In order to accomplish the above object, the present invention provides an MMS system, the MMS system storing a multimedia message transmitted from a specific transmitting mobile station and transmitting the multimedia message to a specific receiving mobile station in response to a download request from the receiving mobile station, including an MMS relay server; a first DB storing the multimedia message whose transmission is requested; a second DB storing specification information of stations; and a transcoder ascertaining a specification of the receiving mobile station with reference to the second DB in response to a request from the MMS relay server, and reconstructing the multimedia message whose transmission is requested to be appropriate for the ascertained receiving mobile station. If, as a result of ascertainment, the receiving mobile station cannot receive at a time the media data included in the multimedia message, the media data included in the multimedia message may be divided into a plurality portions and transmitted to the MMS relay server, and the MMS relay server may successively transmit the divided portions of the media data received from the transcoder in response to a request from the receiving mobile station.

In order to accomplish the above object, the present invention provides an MMS method of storing a multimedia message transmitted from a specific transmitting mobile station and transmitting the multimedia message to a specific receiving mobile station in response to a download request from the receiving mobile station, including a first step of ascertaining the specification of the receiving mobile station in response to a transcoding request; a second step of ascertaining whether image and/or audio data having contents identical to those of the image and/or audio data included in the multimedia message and having a format, a resolution, or a chord appropriate for the specification of the receiving mobile station exists in a DB, when the transcoding of the multimedia message is impossible; a third step of reconstructing the multimedia message into image and/or audio data appropriate for the specification of the receiving mobile station when such image and/or audio data is found in the second step; and a fourth step of transmitting the multimedia message, reconstructed at the third step, to the receiving mobile station.

The multimedia message may be reconstructed into alternative image and/or audio data which can be accommodated in the receiving mobile station when the image and/or audio appropriate for the specification of the receiving mobile station is not found.

The MMS method may further include the steps of ascertaining whether the display size of the receiving mobile station can accommodate the size of an original image included in the multimedia message if the image and/or audio data capable of being accommodated in the receiving mobile station is not found; transmitting the original image included in the multimedia message to the receiving mobile station if the display size of the receiving mobile station can accommodate the size of the image; and performing error-processing if the display size of the receiving mobile station cannot accommodate the size of the image.

BRIEF DESCRIPTION OF THE DRAWINGS

The above and other objects, features and advantages of the present invention will be more clearly understood from the following detailed description taken in conjunction with the accompanying drawings, in which:

FIG. 1 is a system configuration diagram of an MMS system according to the present invention; and FIG. 2 is a flowchart showing a process of transmitting a multimedia message to a receiving mobile station of a lower version according to an embodiment of the present invention.

DESCRIPTION OF THE PREFERRED EMBODIMENTS

Hereinafter, preferred embodiments of the present invention are described in detail with reference to the attached drawings.

FIG. 1 is a system configuration diagram of an MMS system according to the present invention.

As shown in FIG. 1, the MMS system of the present invention includes an MMS relay server 120 composed of an MMS relay 122 and an MMS DB server 124 storing a multimedia message, a station profile DB 130 storing the specification information of stations, a transcoder 150 for conducting the transcoding of the multimedia message, and MMS-Value Added Services (VAS) 160 that is a content pool storing audio and images, included in the multimedia message with various formats, resolutions or chords.

Mobile stations 100 and 106 are devices capable of transmitting MMS messages and reproducing multimedia messages. Base transceiver stations 102 and 108 form wireless links with the mobile stations 100 and 106, respectively. Base station controllers 104 and 110 control the base transceiver stations 102 and 108, respectively, and are in charge of wireless channel setup, frequency hopping and a hand-over process. A mobile switching center 112 is in charge of a route setup for a requested call.

The MMS relay server 120 includes the MMS relay 122 functioning to transmit an MMS message to a requested receiving mobile station, and the MMS DB server 124 storing and controlling the multimedia message requested for transmission. The MMS relay server 120 informs the receiving mobile station of the arrival of the multimedia message through a SMSC 140.

The station profile DB 130 stores the specification information of the mobile stations 100 and 106. The station profile DB 130 is referred to by the transcoder at the time of downloading the multimedia message. When message transmission to the receiving mobile station is requested by the MMS relay server 120, the SMSC 140 transmits a callback Uniform Resource Locator (URL) to the receiving mobile station.

When multimedia message is downloaded to a receiving mobile station, the transcoder 150 cooperates with the MMS relay server 120 to transcode a multimedia message into a format optimum for the specification of the receiving mobile station referring to the station profile DB 130. Also the transcoder 150 ascertains the specification of the receiving mobile station. If, as a result of the ascertainment, it is determined that the multimedia message is not transcoded into a format capable of being reproduced by the receiving mobile terminal, the transcoder 150 reads out the media data, which have contents identical to those of the media data included in the requested multimedia message but have different formats, resolutions or chords, from the MMS-VAS 160, and reconstructs the multimedia message.

The MMS-VAS 160 is a content pool storing media data of identical contents but having various formats, resolutions or chords. It is also referred to as a Multimedia Contents Gateway (MCG). The MMA-VAS 160 ascertains the specification of the receiving mobile station with reference to the station profile DB 130 in response to a request from the transcoder 150, extracts media data of identical contents but having a format, a resolution, or a chord appropriate for the ascertained specification of the receiving mobile station, and provides the media data to the transcoder 150.

When contents providers construct contents, the content providers construct the same contents in various formats, resolutions or chords, and store a set of identical contents but having different formats, resolutions or chords, in the MMS-VAS 160 which is a contents pool.

In this state, the multimedia message the transmission of which is requested by a transmitting mobile station of a higher version is stored in the MMS DB server 124. And, the MMS relay server 120 informs the receiving mobile station of the arrival of the multimedia message through the SMSC 140.

When the download of the stored multimedia message is requested by the receiving mobile station, the MMS relay server 120 ascertains the specification of the receiving mobile station with reference to the station profile DB 130. If, as a result of the ascertainment, the receiving mobile station does not require the conversion of the multimedia message transmitted from the transmitting mobile station, the MMS relay server 120 transmits the multimedia message stored in the MMS DB server 124 to the receiving mobile station.

Hereinafter the method according to the present invention is described referring to FIG. 2. If, as a result of the ascertainment, the receiving mobile station has a version that requires the conversion of the multimedia message transmitted from the transmitting mobile station, the MMS relay server is connected to the transcoder at step S201 and requests the transcoding of the multimedia message at step S203. In this case, the MMS relay server transmits multimedia data to the transcoder.

The transcoder replies to the transcoding request from the MMS relay server at step S205, ascertains the specification of the receiving mobile station, and determines whether the transcoding of the requested multimedia data is possible at step S207. If, as a result of the determination, the transcoding is possible, the transcoder performs the transcoding at step S209. If, as a result of the determination, the transcoding is impossible, the transcoder requests media data of identical contents from the MMS-VAS at step S211.

For example, it is assumed that a transmitting mobile station is a station capable of supporting SIS images 176*144, JPEG images 640*480, text and MA-5 audio, and a receiving mobile station is a station capable of supporting SIS images 120*96, JPEG images 176*144, text and MA-5 audio. In the case of JPEG images, where the resolution conversion is possible, the transcoder transcodes JPEG images 640*480 into JPEG images 176*144 appropriate for the specification of the receiving mobile station. In the case of SIS images and MA-x audio, where the resolution or chord conversion is impossible, the transcoder requests the media data of identical contents but having different resolutions or chords to the MMS-VAS.

The MMS-VAS replies to the media data request from the transcoder, and ascertains the specification of the receiving mobile station with reference to the station profile DB at step S215. Thereafter, the MMA-VAS searches for media data of identical contents but stored in various formats, resolutions or chords. That is, the MMA-VAS extracts a SIS image 120*96, which has contents identical to those of the 176*144 SIS image described in the above example and appropriate for the specification of the receiving mobile station, and extracts the MA-3 audio of contents identical to those of the MA-5 at step S217. The MMS-VAS transmits the extracted media data to the transcoder at step S219.

When the media data are received from the MMS-VAS, the transcoder replies to the MMS-VAS at step S221. And the transcoder transmits the media date which were transcoded at the step S209 or the media data which were received at the step S219 to the MMS relay server.

When the results are received from the transcoder, the MMS relay server responds to the transcoder at step S225, and releases connection with the transcoder at step S227.

Then, the MMS relay server reconstructs a multimedia message based on the results transmitted from the transcoder, and transmits the reconstructed multimedia message to the receiving mobile station.

Meanwhile, the MMS-VAS may fail to find the SIS image of a size appropriate for the specification of the receiving mobile station even though the MMS-VAS has searched for the image. If the MMS-VAS cannot find the SIS image of a size appropriate for the specification of the receiving mobile station, the MMS-VAS searches for the SIS image of a size smaller than that of a desirable size, and transmits the SIS image of the smaller size to the transcoder. However, in the case where the MMS-VAS cannot find the SIS image of a reasonable size even through the above process, the MMS-VAS informs the transcoder that the SIS image has not been found. Then, the transcoder ascertains whether the receiving mobile station can accommodate the size of the file of an original source image included in the multimedia message whose transcoding is requested. If the receiving mobile station cannot accommodate the size, the transcoder informs the MMS relay server of an error to perform error-processing. If the receiving mobile station can accommodate the size, the original source image included in the multimedia message is processed by an engine and transmitted to the MMS relay server.

A method of transmitting a multimedia message according another embodiment of the present invention is described below.

It is assumed that a transmitting mobile station is capable of transmitting SMIL multimedia messages, employs a Hypertext Transfer Protocol (HTTP) as the upload and download protocol of a file, and supports SIS images 176*144, JPEG images 640*480, text and MA-5 audio. Additionally, it is assumed that a receiving mobile station is capable of transmitting photo multimedia messages, uses the HTTP protocol as the upload protocol of a file, uses a WAP as the download protocol of a file, supports SIS images 120*96, JPEG images 176*144, text and MA-3 audio, and is a station incapable of receiving an MMS message because an MMS client is not installed thereon.

Since the receiving mobile station can receive images only at a rate of 20 Kbit through the WAP, the receiving mobile station cannot receive the multimedia message, whose transmission is requested by the transmitting mobile station, as it is. Accordingly, in another embodiment of the present invention, an image is divided into several sheets of images and the divided images are transmitted. That is, the MMS relay server reconstructs the MMS message, whose transmission is requested, into a Wireless Markup Language (WML) form, and creates link menu items, such as "see next image" and "listen next ring tone", on the lower portion of a WML page so that the images can be continuously viewed. This process is described in detail below.

When the transcoder is requested to perform the transcoding of media data at the step S203 of FIG. 2, the transcoder parses the transmitted media data and ascertains the specification of the receiving mobile station. If, as a result of ascertaining the specification of the receiving mobile station, the receiving mobile station is a station that uses a WAP as the download protocol, the transcoder transcodes an image into various sheets of images each having a smaller size, and transmits the transcoded images to the MMS relay server.

The MMS relay server controls the images, divided into various sheets and transmitted from the transcoder, to be successively transmitted to the receiving mobile station. That is, the MMS relay server functions to represent "see next image" on the receiving mobile station while transmitting a first image to the receiving mobile station, and transmits a second image to the receiving mobile station when the "see next image" is selected.

According to the present invention, in the case where the an image or audio included in a multimedia message cannot be transcoded to be appropriate for the specification of a receiving mobile station, the image or audio data included in the multimedia message is replaced with image or audio data capable of being reproduced in the receiving mobile station and transmitted to the receiving mobile station. And an image is divided into various sheets of images corresponding to the buffer size of the receiving mobile station and transmitted to the receiving mobile station. Thus the present invention has an effect in that a multimedia message transmitted from the transmitting mobile station of a higher version can be displayed on the receiving mobile station of a lower version.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A Multimedia Messaging Service (MMS) system, the MMS system storing a multimedia message transmitted from a specific transmitting mobile station and transmitting the multimedia message to a specific receiving mobile station in response to a download request from the receiving mobile station, comprising: an MMS relay server;

a first Database (DB) storing the multimedia message whose transmission is requested;

a second DB storing specification information of stations;

a transcoder ascertaining a specification of the receiving mobile station with reference to the second DB in response to a request from the MMS relay server, and reconstructing the multimedia message whose transmission is requested to be appropriate for the ascertained specification of the receiving mobile station; and a content storage server storing media data of identical contents each having various formats, resolutions, or chords;

wherein, when the transcoding of the image and/or audio data is not possible, the transcoder receives an alternative image and/or audio data having contents identical to that of the image and/or audio data included in the multimedia message whose transmission is requested, but having a format, a resolution or a chord appropriate for the specification of the receiving mobile station, converts the received multimedia message into a plurality of sub-messages, and transmits the converted multimedia message to the MMS relay server;

wherein the MMS relay server transmits subsequent sub-messages to the receiving mobile station upon receiving subsequent requests from the receiving mobile station.

2. The MMS system as set forth in claim 1, wherein the content storage server ascertains the specification of the receiving mobile station with reference to the second DB in response to a request from the transcoder, searches for an image and/or audio data optimum for the specification of the receiving mobile station, provides the optimum image and/or audio data to the transcoder, and searches for an alternative image and/or audio data capable of being reproduced on the receiving mobile station and provides the searched image and/or audio data to the transcoder, when the image and/or audio data optimum for the specification of the receiving mobile station is not found.

3. The MMS system as set forth in claim 1, wherein, when the transcoder is informed that the image appropriate for the receiving mobile station is not found by the content storage server, the transcoder transmits an original image of the multimedia message if a display size of the receiving mobile station can accommodate a size of the original image, or the transcoder provides an error notice if the display size of the receiving mobile station cannot accommodate the size of the original image.

4. An MMS method of storing a multimedia message transmitted from a specific transmitting mobile station and transmitting the multimedia message to a specific receiving mobile station in response to a download request from the receiving mobile station, comprising:

a first step of ascertaining a specification of the receiving mobile station in response to a transcoding request;

a second step of ascertaining whether image and/or audio data having contents identical with those of the image and/or audio data in the multimedia message and having a format, a resolution, or a chord appropriate for the specification of the receiving mobile station exists in a DB, when the transcoding of the requested multimedia message is impossible;

a third step of reconstructing the multimedia message whose transmission is requested into image and/or audio data appropriate for the specification of the receiving mobile station if, as a result of the second step, the image and/or audio data exists; and a fourth step of transmitting the multimedia message, reconstructed at the third step, to the receiving mobile station.

5. The MMS method as set forth in claim 4, wherein the multimedia message whose transmission is requested is reconstructed into alternative image and/or audio data which can be accommodated in the receiving mobile station, when the image and/or audio data appropriate for the specification of the receiving mobile station is not found at the third step.

6. The MMS method as set forth in claim 5, further comprising:

ascertaining whether a display size of the receiving mobile station can accommodate a size of an original image included in the multimedia message when the image and/or audio data capable of being accommodated in the receiving mobile station is not found at the second step;

transmitting the original image included in the multimedia message to the receiving mobile station when the display size of the receiving mobile station can accommodate the size of the image; and performing error-processing if the display size of the receiving mobile station cannot accommodate the size of the image.

7. The MMS method as set forth in claim 6, wherein the original image is processed by an engine and then transmitted to the receiving mobile station when a file of the original image included in the multimedia message is transmitted to the receiving mobile station.

* * * * *